(12) United States Patent
Horiguchi et al.

(10) Patent No.: US 7,331,677 B2
(45) Date of Patent: Feb. 19, 2008

(54) PROJECTION TYPE VIDEO DISPLAY

(75) Inventors: Hirotake Horiguchi, Osaka (JP); Takeshi Higashino, Kyoto (JP); Naoyuki Ikeda, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 341 days.

(21) Appl. No.: 11/233,369

(22) Filed: Sep. 23, 2005

(65) Prior Publication Data

US 2006/0066816 A1    Mar. 30, 2006

(30) Foreign Application Priority Data

Sep. 27, 2004 (JP) ............................. 2004-278741

(51) Int. Cl.
G03B 21/16 (2006.01)
(52) U.S. Cl. .................... 353/57; 353/122; 348/748
(58) Field of Classification Search ................ 353/57, 353/58, 60, 52, 121, 70, 122; 348/745, 746, 348/748
See application file for complete search history.

(56) References Cited

U.S. PATENT DOCUMENTS

| | | | |
|---|---|---|---|
| 6,843,569 B2* | 1/2005 | Hirao et al. ................. | 353/70 |
| 6,962,416 B2* | 11/2005 | Ohara ........................ | 353/70 |
| 2002/0118160 A1* | 8/2002 | Nakamura et al. .......... | 345/101 |
| 2006/0067049 A1* | 3/2006 | Horiguchi et al. .......... | 361/695 |
| 2006/0155424 A1* | 7/2006 | Katoh et al. ................ | 700/300 |

FOREIGN PATENT DOCUMENTS

| | | |
|---|---|---|
| JP | 2001-092014 A | 4/2001 |
| JP | 2001-222065 | 8/2001 |
| JP | 2003-005278 A | 1/2003 |

OTHER PUBLICATIONS

European Search Report dated Dec. 21, 2005, issued corresponding European Application No. 05020841.

* cited by examiner

*Primary Examiner*—Andrew T Sever
(74) *Attorney, Agent, or Firm*—Westerman, Hattori, Daniels & Adrian, LLP.

(57) ABSTRACT

A system control circuit is provided with a table storing portion. In the table storing portion, a table for a positioned-on-a-floor mode and a hung-from-a-ceiling mode, a table for upwardly-positioned, and a table for downwardly-positioned are stored. On each table, temperature of outside air and voltage supplied to each fan power supply are corresponded. In receipt of information indicating a positioned-on-a-floor state (angle=zero degrees) from an attitude detection sensor, the system control circuit selects the table for a positioned-on-a-floor mode and a hung-from-a-ceiling mode. In addition, the system control circuit obtains measured temperature data from a temperature sensor, and applies this measured temperature data to the selection table as a read-out address. As a result, voltage values regarding each fan power supply are read out from the selection table. The system control circuit instructs each fan power supply to drive the fans based on the read-out voltage values.

10 Claims, 4 Drawing Sheets

(a)

POSITIONED ON A FLOOR (ZERO DEGREES)

(b)

HUNG FROM A CEILING (180 DEGREES)

(c)

UPWARDLY POSITIONED
(90 DEGREES)

(d)

DOWNWARDLY POSITIONED
(270 DEGREES)

FIG. 4

(a) POSITIONED-ON-A-FLOOR/HUNG-FROM-A-CEILING

| TEMPERATURE OF OUTSIDE AIR °C | NORMAL | | | ECONOMY | | |
|---|---|---|---|---|---|---|
| | EXHAUST VOLTAGE | LAMP1 VOLTAGE | LAMP2 VOLTAGE | EXHAUST VOLTAGE | LAMP1 VOLTAGE | LAMP2 VOLTAGE |
| 25 | B | D | D | A | A | A |
| 27 | B | D | D | A | A | A |
| 29 | B | D | D | A | A | A |
| 31 | C | D | D | B | A | A |
| 33 | C | D | D | B | A | A |
| 35 | C | D | D | B | A | A |
| 37 | D | D | D | C | A | A |
| 39 | D | D | D | C | A | A |
| 41 | E | E | E | C | A | A |
| 43 | F | E | E | D | B | B |

(b) UPWARDLY-POSITIONED

| TEMPERATURE OF OUTSIDE AIR °C | NORMAL | | | ECONOMY | | |
|---|---|---|---|---|---|---|
| | EXHAUST VOLTAGE | LAMP1 VOLTAGE | LAMP2 VOLTAGE | EXHAUST VOLTAGE | LAMP1 VOLTAGE | LAMP2 VOLTAGE |
| 25 | C | D | D | B | A | a |
| 27 | C | D | D | B | A | a |
| 29 | C | D | D | B | A | a |
| 31 | D | D | D | C | A | a |
| 33 | D | D | D | C | A | a |
| 35 | E | D | D | C | A | a |
| 37 | E | D | D | D | A | a |
| 39 | E | D | D | D | A | A |
| 41 | F | E | E | E | A | A |
| 43 | F | E | E | F | B | A |

(c) DOWNWARDLY-POSITIONED

| TEMPERATURE OF OUTSIDE AIR °C | NORMAL | | | ECONOMY | | |
|---|---|---|---|---|---|---|
| | EXHAUST VOLTAGE | LAMP1 VOLTAGE | LAMP2 VOLTAGE | EXHAUST VOLTAGE | LAMP1 VOLTAGE | LAMP2 VOLTAGE |
| 25 | B | B | A | A | A | a |
| 27 | B | B | A | A | A | a |
| 29 | B | B | A | A | A | a |
| 31 | C | B | A | B | A | a |
| 33 | C | B | A | B | A | a |
| 35 | C | B | A | B | A | a |
| 37 | D | B | A | C | A | a |
| 39 | D | B | A | C | A | a |
| 41 | E | C | A | C | A | a |
| 43 | F | C | B | D | B | a |

PROJECTION TYPE VIDEO DISPLAY

TECHNICAL FIELD

The present invention relates to a projection type video display such as a liquid crystal projector, etc.

BACKGROUND ART

Because of a configuration in which light emitted from a light source is modulated by a light valve such as a liquid crystal panel, etc., and the modulated light is projected, a projection type video display needs to be provided with a high-intensity light source. For this, it is needed to prepare measures against heat generated from the high-intensity light source itself, or heat generated at a time that the light is absorbed by a polarizer of a liquid crystal panel or various kinds of optical components. From the past, an intake and exhaust are performed by rotating a cooling fan by a motor so as to release the heat to outside the video display (see Japanese Patent Laying-open No. 2001-222065).

However, in a conventional cooling fan control, it is assumed that the projection type video display is used in a state of being positioned on a floor, and it was not possible to realize an appropriate cooling control if used in another attitude.

SUMMARY OF THE INVENTION

In view of the above described circumstance, it is an object of the present invention to provide a projection type video display capable of carrying out an appropriate cooling control when used in various attitudes.

In order to solve the above-described problem, a projection type video display according to the present invention is a projection type video display for applying an optical modulation to light emitted from a light source by a light valve, and projecting image light obtained by this optical modulation, and comprises a cooling means for cooling inside the display, an attitude sensor for determining attitudes of the display, a group of tables on which control contents of the cooling means are defined in such a manner as to correspond to each attitude, and a control means for selecting a table from the group of tables based on an output of the attitude sensor, controlling the cooling means based on the selected table.

In the above configuration, the table is selected according to an attitude of the projection type video display, and the cooling means is controlled based on the control content defined on the table, so that an appropriate cooling control used in various attitudes becomes possible.

In a projection type video display according to the above configuration, the cooling means may be formed of a fan, and a fan driving portion for driving the fan. In addition, in this configuration, a projection type video display may be provided with a fan for supplying outside air to inside the display, and a fan for exhausting air inside the display to outside as the fan.

In a projection type video display according to these configurations, the attitude sensor may be provided with an acceleration sensor. In addition, in a projection type video display according to these configurations, the table may be a table on which at least one of temperature of outside air and a barometric pressure is corresponded to driving voltage supplied to the cooling means. Furthermore, in a projection type video display of these configurations, the table may be formed of a normal mode-use table, and an economy mode-use table. In addition, in a projection type video display of these configurations, the table may be formed of at least a table for a time of driving a light source by first electric power, and a table for a time of driving a light source by second electric power. In addition, a projection type video display according to these configurations may comprise a plurality of light sources as the light source, in which the table is formed of at least a table for a time that all the light sources are turned on, and a table for a time that one or a few light sources is turned on. Furthermore, in a projection type video display according to these configurations, one table is used in common for two kinds of attitudes. In addition, a projection type video display according to these configurations may comprise a sensor for detecting an inclination of the display in order to correct a distortion of a projected video, in which this sensor is also used as the attitude sensor.

According to the present invention, it is possible to perform an appropriate cooling control used in various attitudes.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a descriptive diagram showing a table that the liquid crystal projector of the embodiment of the present invention stores.

BEST MODE FOR PRACTICING THE INVENTION

Hereinafter, a liquid crystal projector of an embodiment of the present invention will be described based on FIG. 1 to FIG. 4.

Figure 1:
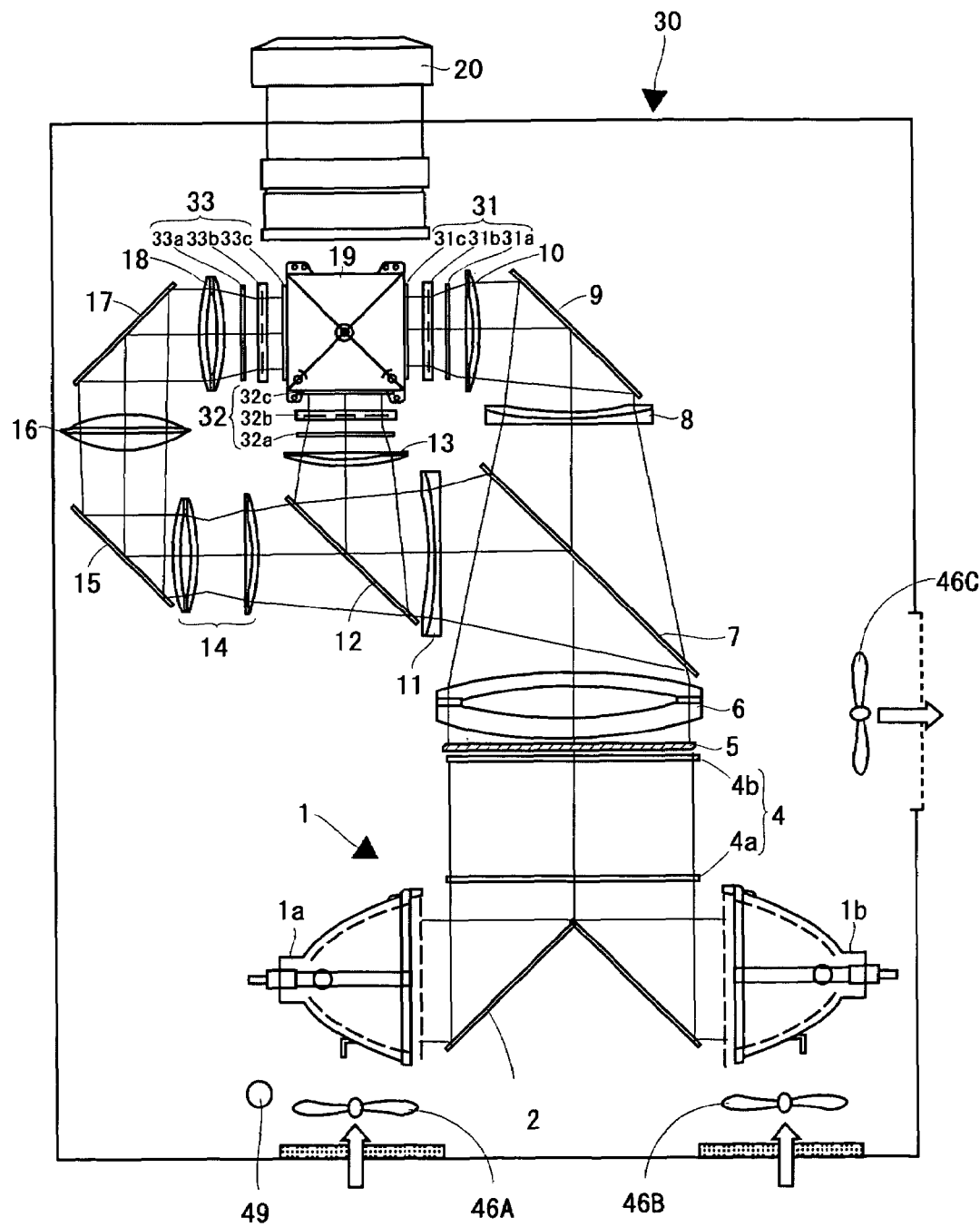
FIG. 1 is a structural view showing an optical system of a liquid crystal projector, etc., of an embodiment of the present invention.

FIG. 1 is a view showing an optical system of a liquid crystal projector 30, etc., of this embodiment. An illuminating device 1 is formed of a first lamp 1a, a second lamp 1b, and mirrors 2 arranged between the lamps 1a, 1b. Each lamp is formed of an ultra-high pressure mercury lamp, a metal halide lamp, a xenon lamp, etc., light emitted from each lamp is converted into collimated light by a parabolic reflector. Then, the light is guided to an integrator lens 4.

The integrator lens 4 is constituted of a pair of fly's eye lenses 4a, 4b, and each pair of the lenses introduces light emitted from the illuminating device 1 to an entire surface of a liquid crystal display panel described later. In addition, the integrator lens 4 evens off a partial luminance non-uniformity existing in the illuminating device 1, and decreases a difference between a light amount in a screen (panel) center and that on a peripheral side. The light passing through the integrator lens 4, via a polarization conversion system 5 and a condenser lens 6, is introduced to a first dichroic mirror 7.

The polarization conversion system 5 is constituted of a polarization beam splitter array (Hereinafter, referred to as a PBS array). The PBS array is provided with a polarized light separating surface, and a retardation plate (½ λ plate). Each polarized light separating surface of the PBS array transmits P-polarized light, for example, out of light from the integrator lens 4, and changes an optical path of S-polarized light by 90 degrees. The S-polarized light having the optical path changed is reflected by an adjacent polarized light separating surface, and is directly exited therefrom. On the other hand, the P-polarized light passing through the polarized light separating surface is converted into the S-polarized light by the retardation plate provided on a front side (light-exit side) of the polarized light separating surface, and is exited therefrom. That is, in this case, approximately all light is converted into the S-polarized light.

The first dichroic mirror 7 transmits light in a red wavelength band, and reflects light in a cyan (green+blue) wavelength band. The light in a red wavelength band passing through the first dichroic mirror 7 enters a concave lens 8, and is reflected by a reflection mirror 9. As a result, an optical path of the light in a red wavelength band is changed. The light of red color reflected by the reflection mirror 9, via a lens 10, passes through a red color-use transmission-type liquid crystal display panel 31. As a result of the passing therethrough, the light of red color is optically modulated. On the other hand, light in a cyan wavelength band reflected by the first dichroic mirror 7, via a concave lens 11, is introduced to a second dichroic mirror 12.

The second dichroic mirror 12 transmits light in a blue wavelength band, and reflects light in a green wavelength band. The light in a green wavelength band reflected by the second dichroic mirror 12, via a lens 13, is introduced to a green color-use transmission-type liquid crystal display panel 32. As a result of passing therethrough, the light in a green wavelength band is optically modulated. In addition, the light in a blue wavelength band passing through the second dichroic mirror 12, via a relay lens 14, a reflection mirror 15, a relay lens 16, a reflection mirror 17 and a relay lens 18, is introduced to a blue color-use transmission-type liquid crystal display panel 33. As a result of passing therethrough, the light in a blue wavelength band is optically modulated.

Each liquid crystal display panel 31, 32, or 33 is formed of being provided with incidence-side polarizers 31*a*, 32*a*, and 33*a*, panel portions 31*b*, 32*b*, and 33*b* formed by sealing liquid crystal between a pair of glass plates (on which a pixel electrode and an alignment film are formed), and exit-side polarizers 31*c*, 32*c*, and 33*c*.

The modulated light (image light of respective colors) modulated by passing through the liquid crystal display panels 31, 32, and 33 is combined by a cross dichroic prism 19, and as a result, is changed to full-color image light. This full-color image light is projected by a projection lens 20, and displayed on a screen not shown.

In the vicinity of the first lamp 1*a*, a first lamp cooling fan 46A is provided, and in the vicinity of the second lamp 1*b*, a second lamp cooling fan 46B is provided. Each cooling fan generates a cooling wind by taking in outside air from outside a main body of the liquid crystal projector 30, and supplies this cooling wind to each lamp. In addition, the liquid crystal projector 30 is provided with an exhaust fan 46C. The exhaust fan 46C exhausts air inside the main body to outside the main body.

Figure 2:
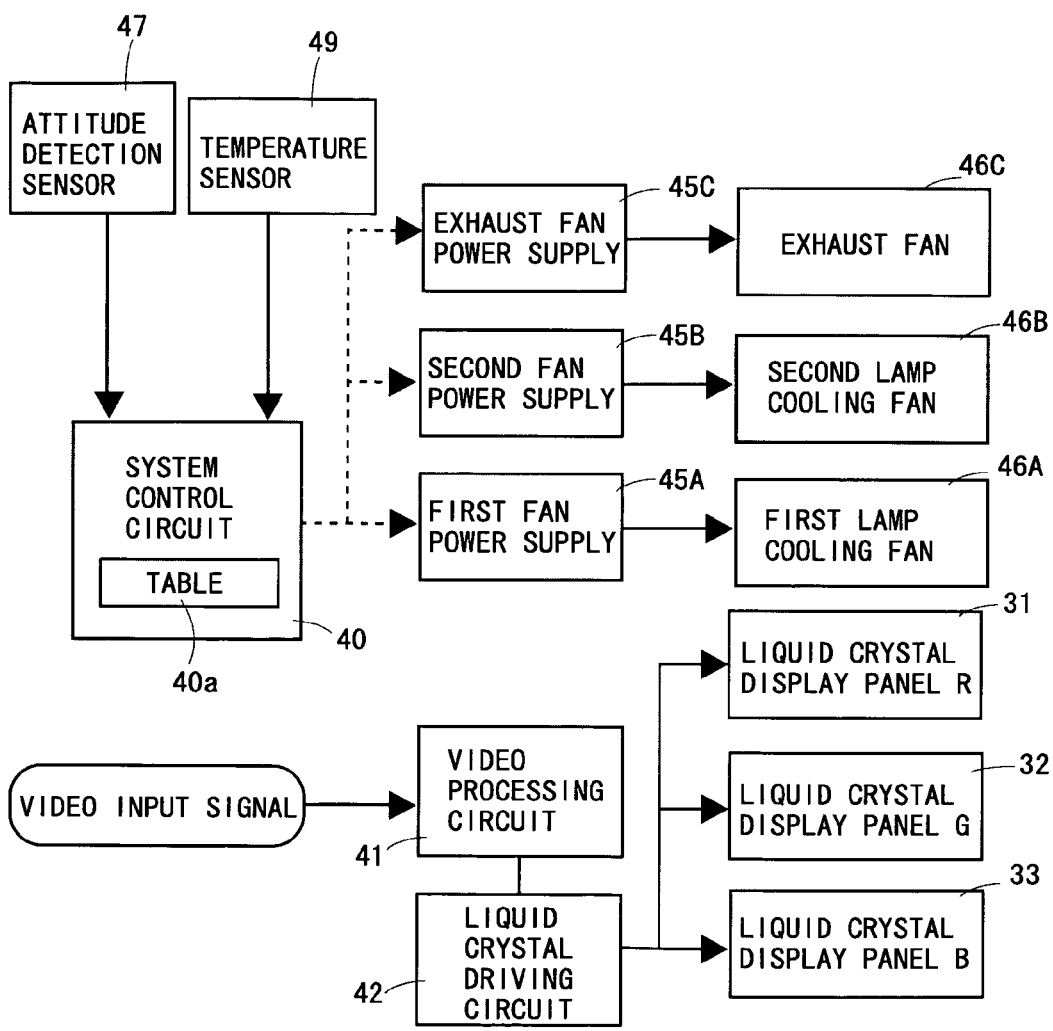
FIG. 2 is a block chart showing a fan control system of the liquid crystal projector of the embodiment of the present invention.
Figure 3:
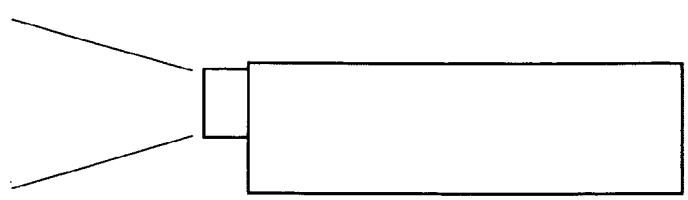
FIG. 3 is a descriptive diagram showing various kinds of attitudes of the liquid crystal projector.
Figure 3:
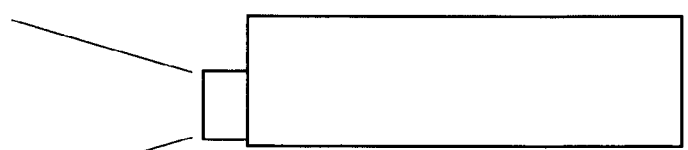
Figure 3:
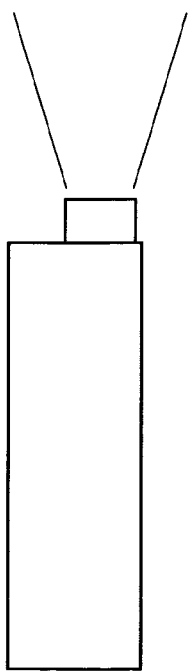
Figure 3:
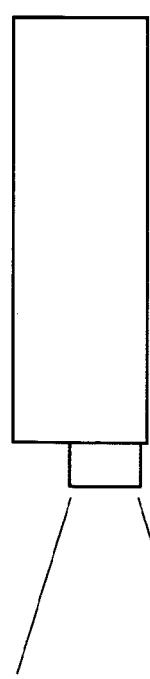

FIG. 2 is a block chart showing a video processing system and a fan control system in the liquid crystal projector 30. A video signal processing circuit 41 inputs a video signal, and subjects the input signal to a frequency conversion (conversion of the number of scanning lines), a gamma correction process in view of an added voltage—light-transmissible characteristic, and other processes, and applies this corrected video signal (video data) to a liquid crystal driving circuit 42. The liquid crystal driving circuit 42 drives the liquid crystal display panels 31, 32, and 33 based on the video signal. The system control circuit 40 controls operations of a first fan power supply 45A, a second fan power supply 45B, an exhaust fan power supply 45C, etc. The first fan power supply 45A supplies electric power to the first lamp cooling fan 46A, the second fan power supply 45B supplies electric power to the second lamp cooling fan 46B, and the exhaust fan power supply 45C supplies electric power to the exhaust fan 46C.

A temperature sensor 49 (see FIG. 1, too) measures temperature of outside air taken in from outside the main body of the liquid crystal projector 30. Measured temperature data is input into the system control circuit 40. An attitude detection sensor 47 is formed of an acceleration sensor for detecting an inclination of the attitude detection sensor 47 itself with respect to a gravitational direction, and detects attitudes of the liquid crystal projector 30. That is, the attitude detection sensor 47 applies to the system control circuit 40 information indicating what states the liquid crystal projector 30 is in, e.g., a positioned-on-a-floor state (angle=zero degrees), a hung-from-a-ceiling state (angle=180 degrees), an upwardly-positioned state (angle=90 degrees), and a downwardly-positioned state (angle=270 degrees), as shown in (a) to (d) in FIG. 3. There are cases of not possible to make a determination of whether the liquid crystal projector 30 is in the positioned-on-a-floor state (angle=zero degrees), or in the hung-from-a-ceiling state (angle=180 degrees) depending on kinds or the number of the acceleration sensors. However, in these cases, an auxiliary sensor 49*a* may be provided. The auxiliary sensor 49*a* is formed of having a metal ball inside its tube, having a first terminal at one end of the tube, and having a second terminal at the other end of the tube. This auxiliary sensor 49*a* is arranged so that it is placed in a vertical direction in the positioned-on-a-floor state. Each terminal is conducted as a result of contacting the metal ball. Therefore, by detecting which end of the first terminal or the second terminal is conducted, it becomes possible to make the determination. Instead of the metal ball, mercury may be inserted in the tube.

The system control circuit 40 is provided with a table storing portion (memory) 40*a*. In this table storing portion 40*a*, a table (a), which is for a positioned-on-a-floor mode and a hung-from-a-ceiling mode, a table (b), which is for an upwardly-positioned mode, and a table (c), which is for a downwardly-positioned mode, are stored, as shown in FIG. 4. On each table, the temperature of outside air and voltage supplied to each fan power supply are corresponded. Furthermore, each table is formed of a normal mode-use table, and an economy mode-use table. It is noted that on each table in FIG. 4, letters "a" and from A to F indicate voltage values, and the order of a level of the voltage values of a to F is a <A<B<C<D<E<F. In the liquid crystal projector in this embodiment, there is no difference in manner of cooling (a manner of how a cooling wind flows, distribution of heat, etc.) between the positioned-on-a-floor state and the hung-from-a-ceiling state, and therefore, the table (a) in FIG. 4 is used in common for the positioned-on-a-floor state and the hung-from-a-ceiling state. However, in a case of a liquid crystal projector having a different manner of cooling between the positioned-on-a-floor state and the hung-from-a-ceiling state, a sensor for distinguishing between the positioned-on-a-floor state and the hung-from-a-ceiling state, and a table for a positioned-on-a-floor mode and a table for a hung-from-a-ceiling mode are prepared, respectively.

In receipt of the information indicating the positioned-on-a-floor state (angle=zero degrees) from the attitude detection sensor 47, the system control circuit 40 selects the table (a) in FIG. 4, which is for a positioned-on-a-floor mode and a hung-from-a-ceiling mode. In addition, the system control circuit 40 receives the temperature data from the temperature sensor 49, and furthermore, applies this temperature data to the selected table as a read-out address. As a result, voltage data regarding each fan power supply is read out from the selected table. The system control circuit 40 instructs each fan power supply to drive each of the fans based on the read-out voltage data. For example, if the temperature detected by the temperature sensor 49 is 35° C. (degrees centigrade), and in a case of a normal mode, the first lamp cooling fan 46A is driven on a voltage value D by the first fan power supply 45A, the second lamp cooling fan 46B is driven on the voltage value D by the second fan power supply 45B, and the exhaust fan 46C is driven on a voltage value C by the exhaust fan power supply 45C. It is noted that in the table in FIG. 4, a lamp 1 indicates the voltage value for the first lamp cooling fan 46A and a lamp 2 indicates the voltage value for second lamp cooling fan 46B.

In receipt of the information indicating the upwardly-positioned state (angle=90 degrees) from the attitude detection sensor 47, the system control circuit 40 selects the table (b) in FIG. 4, which is for an upwardly-positioned mode, and carries out a similar process described above. In receipt of the information indicating the downwardly-positioned state (angle=270 degrees) from the attitude detection sensor 47, the system control circuit 40 selects the table (c) in FIG. 4, which is for a downwardly-positioned mode, and carries out a similar process described above.

On the above-described tables, the temperature of outside air and the voltage supplied to each fan power supply are corresponded. However, instead thereof, or in addition thereto, a table on which a barometric pressure is added may be adopted. For example, at a time of a certain barometric pressure value, a first table on which the temperature of outside air and the voltage supplied to each fan power supply are corresponded is selected, and at a time of another barometric pressure value, a second table on which the temperature of outside air and the voltage supplied to each fan power are corresponded is selected. Of course, in this case, a barometric pressure sensor is provided so as to supply barometric pressure data to the system control circuit 40. In addition, the table may be formed of at least a table for a time that all lamps are turned on (a table used in a case that four lamps, out of the four lamps, are turned on, or a table used in a case that two lamps, out of the two lamps, are turned on, for example), and a table for a time that one or a few lamps are turned on (a table used in a case that two lamps, out of four lamps, are turned on, or a table used in a case that one lamp, out of two lamps, is turned on, for example).

In addition, in the above-described embodiment, a fan (for cooling by air) is shown as a means for cooling inside the display. However, in a case of being provided with a mechanism for cooling inside the display by liquid, too, a similar control is possible. In the mechanism for cooling inside the display by liquid, a table for defining voltage supplied to a pump may be provided, for example.

Furthermore, in the projection type video display, it is conceivable to be provided with a sensor for detecting an inclination of the display so as to automatically correct a distortion (trapezoidal distortion) of a projected video based on an output of this sensor. In the projection type video display provided with the sensor for such the correction, the sensor may be used as the above-described attitude sensor.

It is noted that in the above-described embodiment, a three-panel liquid crystal projector using the liquid crystal display panels is shown. However, the present invention is applicable to a liquid crystal projector provided with another image light generating system.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A projection type video display for applying an optical modulation to light emitted from a light source by a light valve, and projecting image light obtained by this optical modulation, comprising:
    a cooling means for cooling inside the display;
    an attitude sensor for determining attitudes of the display;
    a group of tables on which control contents of the cooling means are defined in such a manner as to correspond to each attitude; and
    a control means for selecting a table from the group of tables based on an output of the attitude sensor, and controlling the cooling means based on the selected table.

2. A projection type video display according to claim 1, wherein the cooling means is formed of a fan, and a fan driving portion for driving the fan.

3. A projection type video display according to claim 2, comprising a fan for supplying outside air to inside the display, and a fan for exhausting air inside the display to outside as the fan.

4. A projection type video display according to claim 1, wherein the attitude sensor is provided with an acceleration sensor.

5. A projection type video display according to claim 1, wherein the table is a table on which at least one of temperature of outside air and a barometric pressure is corresponded to driving voltage supplied to the cooling means.

6. A projection type video display according to claim 1, wherein the table is formed of a normal mode-use table and an economy mode-use table.

7. A projection type video display according claim 1, wherein the table is formed of at least a table for a time of driving a light source by first electric power, and a table for a time of driving a light source by second electric power.

8. A projection type video display according to claim 1, comprising a plurality of light sources as the light source, wherein the table is formed of at least a table for a time that all the light sources are turned on, and a table for a time that one or a few light sources are turned on.

9. A projection type video display according to claim 1, wherein one table is used in common for two attitudes.

10. A projection type video display according to claim 1, comprising a sensor for detecting an inclination of the display in order to correct a distortion of a projected video, wherein this sensor is also used as the attitude sensor.

* * * * *